(12) United States Patent
Ingraham

(10) Patent No.: US 10,785,972 B2
(45) Date of Patent: Sep. 29, 2020

(54) INVERTED HORSESHOE HAVING ADJUSTABLE HEEL WEDGE AND METHODS OF USING SAME

(71) Applicant: Challen Ingraham, Tabernacle, NJ (US)

(72) Inventor: Challen Ingraham, Tabernacle, NJ (US)

(*) Notice: Subject to any disclaimer, the term of this patent is extended or adjusted under 35 U.S.C. 154(b) by 153 days.

(21) Appl. No.: 16/185,098

(22) Filed: Nov. 9, 2018

(65) Prior Publication Data

US 2020/0146272 A1    May 14, 2020

(51) Int. Cl.
*A01L 3/04* (2006.01)
*A01L 7/02* (2006.01)

(52) U.S. Cl.
CPC .. *A01L 3/04* (2013.01); *A01L 7/02* (2013.01)

(58) Field of Classification Search
CPC ..... A01L 3/04; A01L 7/02; A01L 1/04; A01L 15/00; A01K 13/007
USPC ...................... 168/4, 10, 24; 54/82
See application file for complete search history.

(56) References Cited

U.S. PATENT DOCUMENTS

| 123,404 | A | * | 2/1872 | Kinghorn | .................. | A01L 1/04 |
| | | | | | | 168/8 |
| 382,131 | A | * | 5/1888 | Bingham | .................. | A01L 1/04 |
| | | | | | | 168/7 |
| 4,580,637 | A | | 4/1986 | King | | |
| 5,168,934 | A | | 12/1992 | Nebel et al. | | |
| 5,230,384 | A | | 6/1993 | Nebel et al. | | |
| 5,253,715 | A | * | 10/1993 | Ovnicek | .................. | A01L 7/02 |
| | | | | | | 168/14 |
| 5,439,062 | A | * | 8/1995 | Ovnicek | .................. | A01L 7/02 |
| | | | | | | 168/14 |
| 5,711,377 | A | * | 1/1998 | Foster | .................. | A01K 13/007 |
| | | | | | | 168/14 |
| 5,727,633 | A | * | 3/1998 | Ovnicek | .................. | A01L 7/02 |
| | | | | | | 168/24 |
| 6,082,462 | A | | 7/2000 | Lyden | | |
| 6,443,232 | B1 | | 9/2002 | Moller et al. | | |
| 6,497,293 | B1 | | 12/2002 | Miller | | |
| 8,413,731 | B2 | * | 4/2013 | Ovnicek | .................. | A61D 9/00 |
| | | | | | | 168/10 |
| 10,292,378 | B2 | * | 5/2019 | Ruetenik | .................. | A01L 7/02 |
| 2004/0031616 | A1 | | 2/2004 | Moller et al. | | |
| 2007/0068682 | A1 | | 3/2007 | McKinlay | | |
| 2007/0114045 | A1 | * | 5/2007 | Morris | .................. | A01L 7/02 |
| | | | | | | 168/14 |
| 2009/0044511 | A1 | | 2/2009 | Brisson | | |
| 2010/0223893 | A1 | * | 9/2010 | D'Arpe | .................. | A01L 15/00 |
| | | | | | | 54/82 |
| 2011/0278025 | A1 | * | 11/2011 | Hamilton | .................. | A01L 11/00 |
| | | | | | | 168/48.1 |
| 2014/0262353 | A1 | | 9/2014 | Bergeleen et al. | | |

(Continued)

FOREIGN PATENT DOCUMENTS

EP    1060666 A2    12/2000

*Primary Examiner* — Michael McCullough
(74) *Attorney, Agent, or Firm* — Wei & Sleman LLP

(57) ABSTRACT

A horseshoe having a front end and a back end includes a curved heel plate disposed adjacent the back end, a pair of side branches coupled to opposing ends of the curved heel plate, a heel wedge coupled to the heel plate, the wedge being translatable relative to the heel plate, a fabric coupled to the pair of side branches and a pair of cushions coupled to the fabric and disposed over the pair of side branches.

18 Claims, 8 Drawing Sheets

(56) References Cited

U.S. PATENT DOCUMENTS

| | | |
|---|---|---|
| 2015/0238344 A1 | 8/2015 | Nylund |
| 2015/0245602 A1 | 9/2015 | Nylund |
| 2015/0305317 A1* | 10/2015 | Hall .......................... A01L 7/02 168/4 |
| 2016/0192634 A1 | 7/2016 | Basic |
| 2017/0071183 A1 | 3/2017 | Bergeleen et al. |
| 2017/0258066 A1 | 9/2017 | Stevenson et al. |
| 2018/0139945 A1 | 5/2018 | Revheim et al. |

* cited by examiner

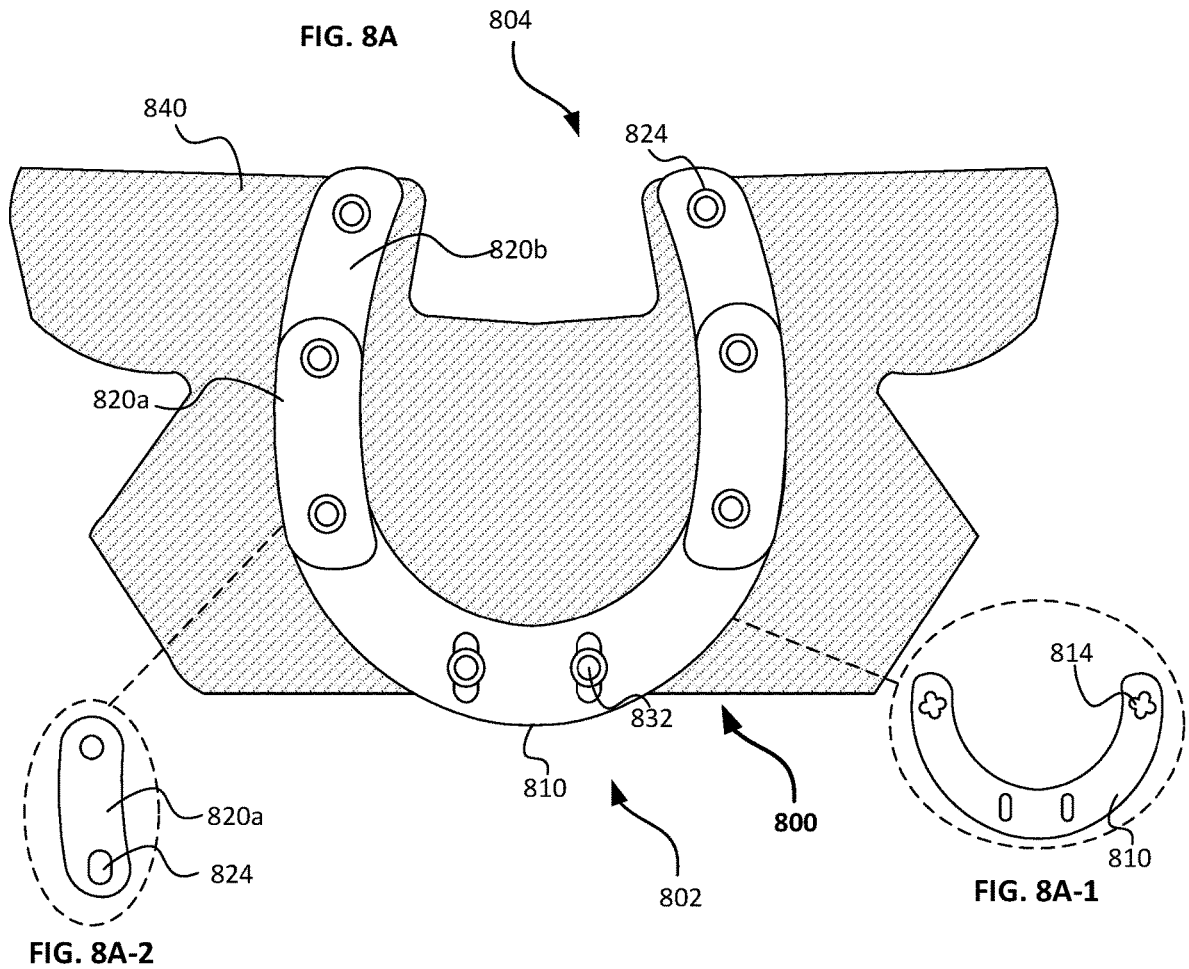
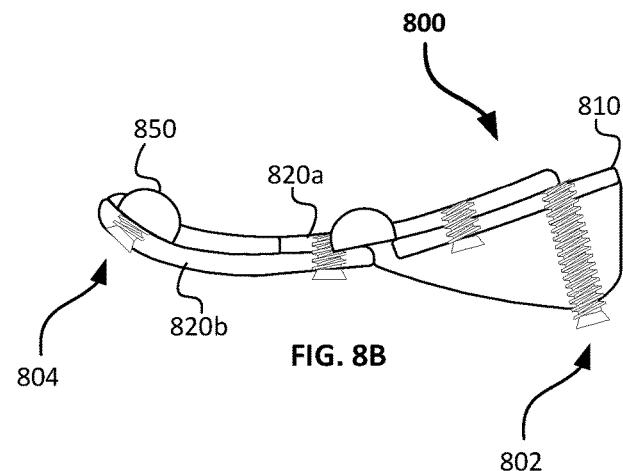

ary, the present disclosure relates to specialty horseshoes
for hoofed animals having conditions, such as laminitis.

INVERTED HORSESHOE HAVING ADJUSTABLE HEEL WEDGE AND METHODS OF USING SAME

FIELD OF THE DISCLOSURE

The present disclosure relates to devices and methods for treating certain diseases in hoofed animals. More particularly the present disclosure relates to specialty horseshoes for hoofed animals having conditions, such as laminitis.

BACKGROUND OF THE DISCLOSURE

Proper load distribution on a horse's feet are important to the overall health of the animal. Laminitis is a serious medical condition in horses and other hoofed animals, and despite significant advances in veterinarian medicine, remains a major reason for euthanasia of such animals. Laminitis is an inflammation of the lamina and the inner hoof wall. Laminitis is characterized by separation of the hoof wall from the distal phalanx due to the deterioration and detachment of the lamina, which holds the two together. Failure of the laminar attachments, in a majority of cases is limited to the toe region. It is hypothesized that without the distal phalanx properly attached to the inside of the hoof wall, the weight of the horse and the forces of locomotion by the deep digital flexor tendon cause the distal phalanx to rotate away from the hoof capsule. This process shears the vasculature and crushes the corium (dermis) of the sole, causing unrelenting pain and a characteristic lameness. Radiographic and necropsy examination of the feet of affected horses show a characteristic rotation of the dorsal border of the distal phalanx away from the dorsum of the hoof wall.

Laminitis can occur secondary to many diseases of the horse, but is common following overeating, colic, fever, shock, pneumonia, injury and obesity.

Many hoofed animals, and particularly horses, are susceptible to laminitis and significant economic loss occurs due to severe pain and debilitation of these animals. Due to the insidious nature of the disease process, damage to the laminae often occurs prior to clinical evidence of abnormality.

Current medical therapies include identification and treatment of the underlying disease, systemic anti-inflammatory medications and rest. A more aggressive treatment of the sequela of laminitis involves severing the deep digital flexor tendon. Additionally, support of the sole has met with some success utilizing deep sand flooring, peat moss and foam sole pads.

Surgical transection of the deep digital flexor tendon (DDFT) has also been used to reduce the shearing forces during the acute phase of laminitis. One study reported a 60% survival rate at 2 years after the procedure. Those animals who do recover from the severing of the deep digital flexor tendon are usually not comfortable enough to ride. Even with these issues in mind, current veterinary practices suggest that a deep digital flexor tenotomy is the fastest way to counteract the rotational forces and restore the perfusion and tissue mass to the dorsal regions of the foot.

Other conventional methods include the use of wedge shoes, but these suffer from several shortcomings.

SUMMARY OF THE DISCLOSURE

In some embodiments, a horseshoe having a front end and a back end includes a curved heel plate disposed adjacent the back end, a pair of side branches coupled to opposing ends of the curved heel plate, a heel wedge coupled to the heel plate, the wedge being translatable relative to the heel plate, a fabric coupled to the pair of side branches, and a pair of cushions coupled to the fabric and disposed over the pair of side branches.

In some embodiments, a method of supporting a horse's hoof includes providing with a horseshoe having a front end and a back end including a curved heel plate disposed adjacent the back end, a pair of side branches coupled to opposing ends of the curved heel plate, a heel wedge coupled to the heel plate, the wedge being translatable relative to the heel plate, a fabric disposed coupled to the pair of side branches, and a pair of cushions coupled to the fabric and disposed over the pair of side branches, adjusting an angle of each of the side branches, and adjusting a position of the heel wedge relative to the heel plate.

BRIEF DESCRIPTION OF THE DISCLOSURE

Various embodiments of the presently disclosed horseshoes are shown herein with reference to the drawings, wherein.

Figure 1:
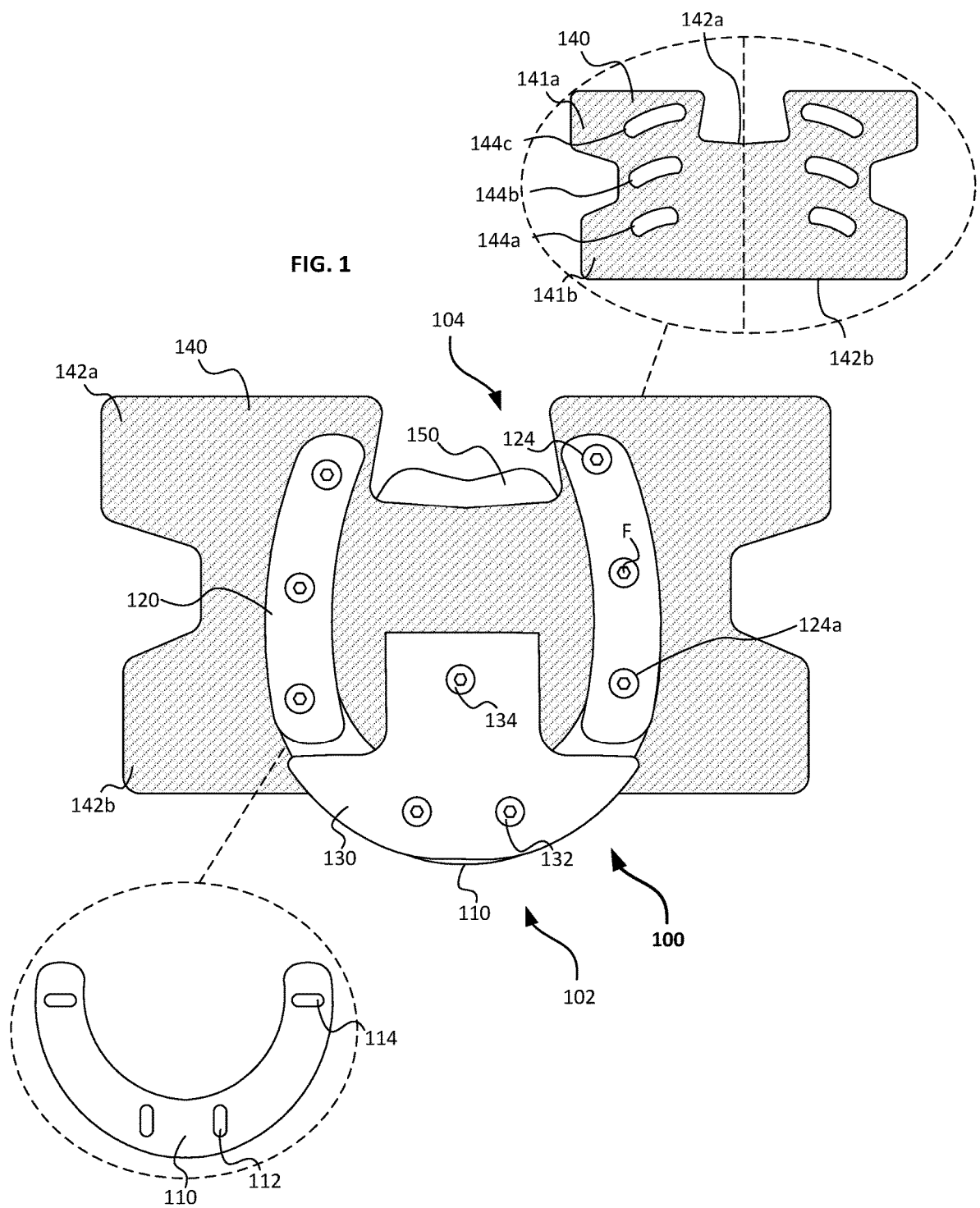
FIG. 1 is a schematic bottom view of one example of a horseshoe according to the present disclosure.
Figure 4A:
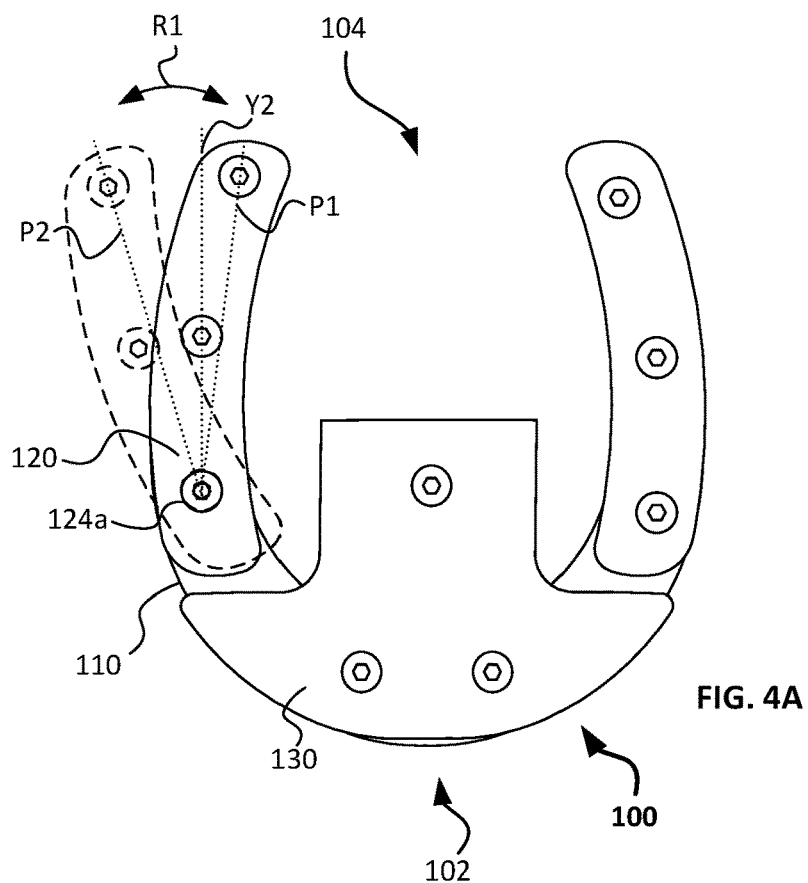
Figure 4B:
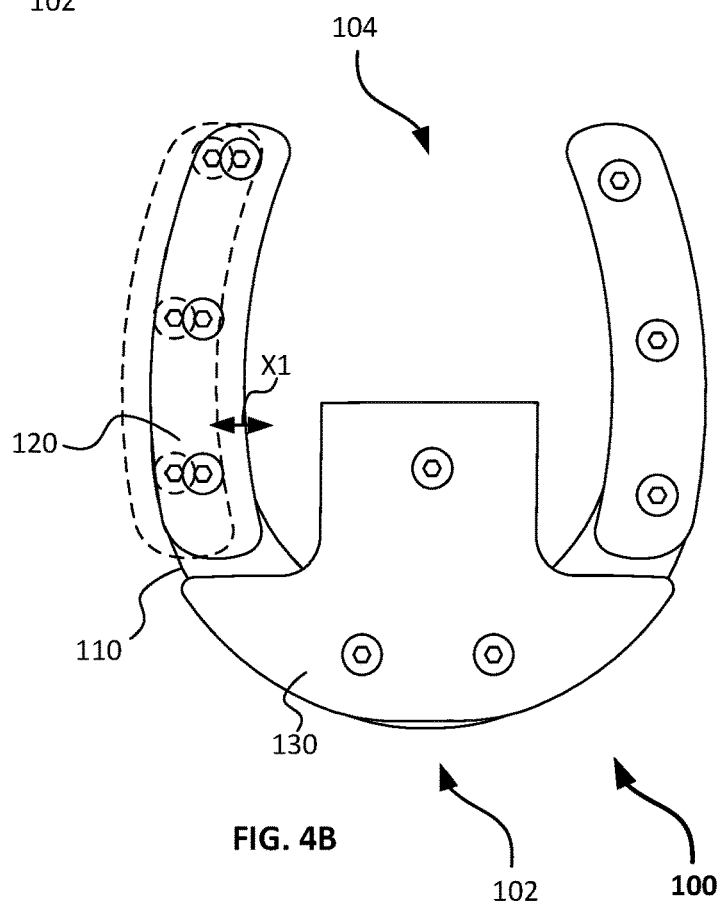
Figure 5:
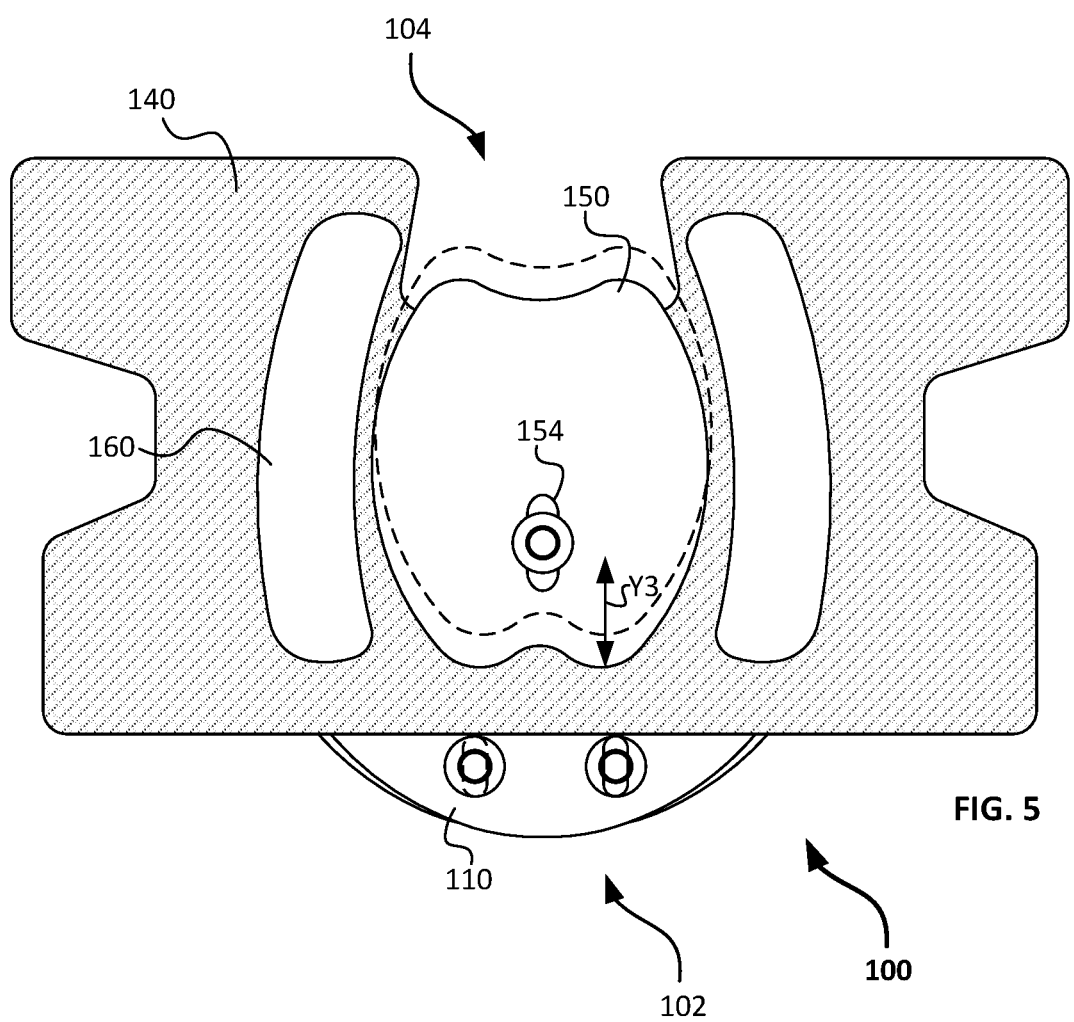
Figure 6:
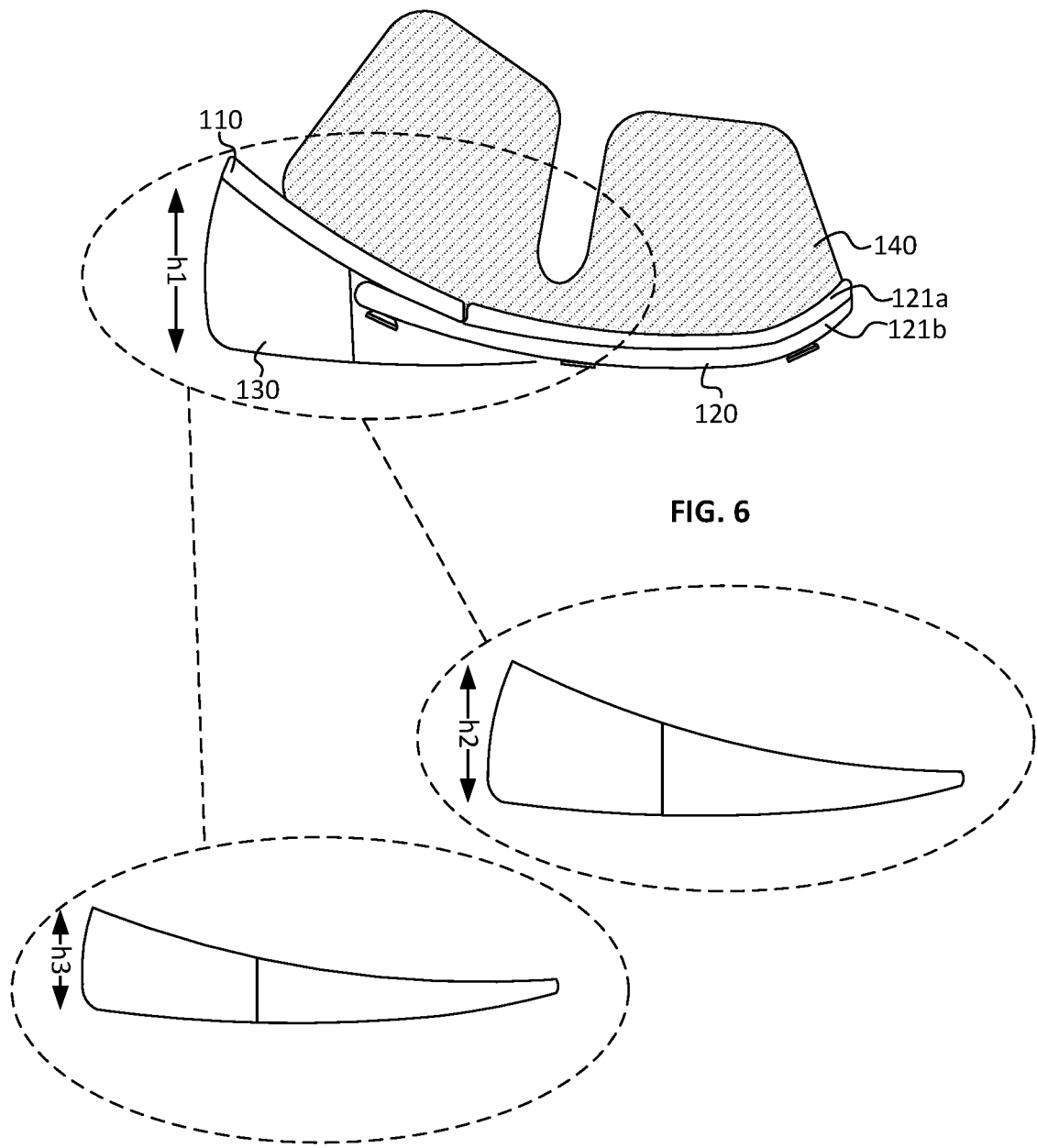
Figure 7A:
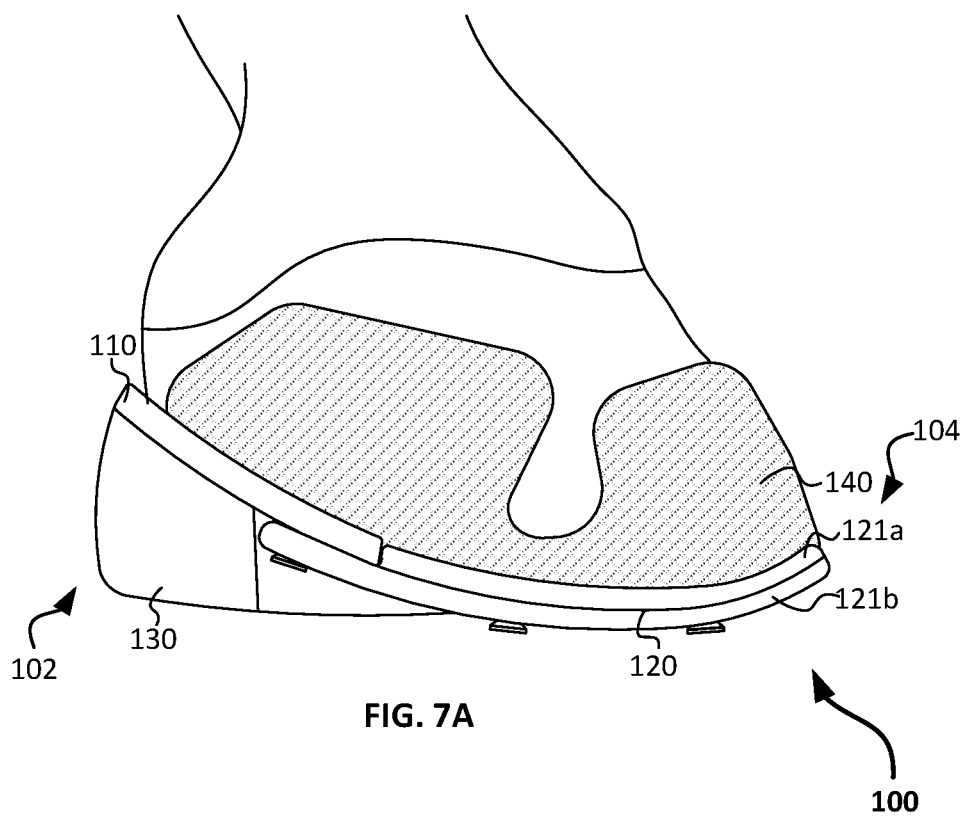
Figure 7B:
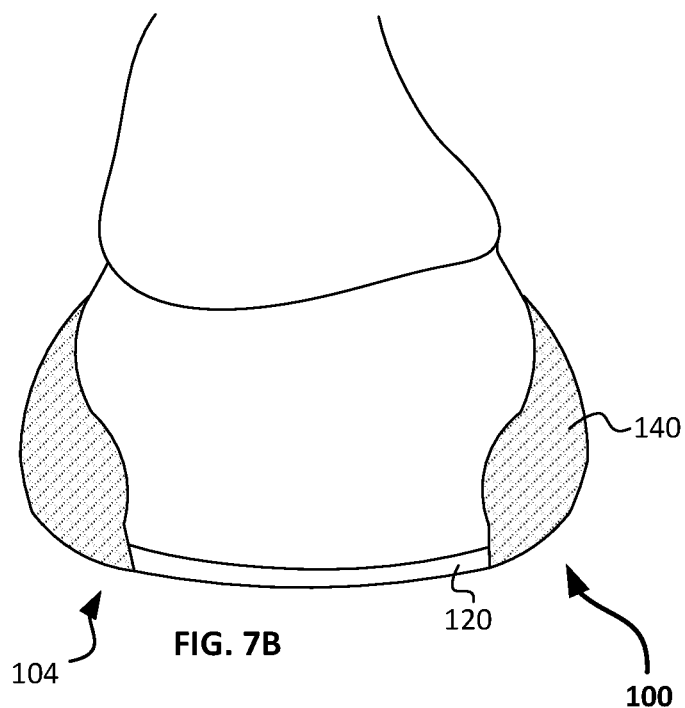

FIGS. 4A-B are schematic bottom views of the horseshoe of FIG. 1 showing articulation of the side branches;

FIG. 5 is a schematic top view of the horseshoe of FIG. 1 showing translation of the sole plate;

FIG. 6 are schematic side views of the horseshoe of FIG. 1 showing wedges of different heights;

FIGS. 7A-B are schematic side and front views of the horseshoe of FIG. 1 shod on a horse's hoof; and FIGS. 8A-B are schematic top and side views of another example of a horseshoe according to the present disclosure.

Various embodiments of the present invention will now be described with reference to the appended drawings. It is to be appreciated that these drawings depict only some embodiments of the invention and are therefore not to be considered limiting of its scope.

DETAILED DESCRIPTION

Despite the various improvements that have been made to horseshoes and their methods of use, conventional devices suffer from some shortcomings as described above.

There therefore is a need for further improvements to the devices, systems, and methods of providing support to hoofed animals. Among other advantages, the present disclosure may address one or more of these needs. As used herein, the term "front" will refer to a location or direction closer to an animal's toe and the term "back" will refer to a location or direction closer to the animal's heel. "Top" refers to a structure closer to the hoof of an animal, while "bottom" refers to a structure further farther from the animal's hoof.

FIG. 1 illustrates a generally U-shaped horseshoe 100, the horseshoe having an inverted orientation that the is the opposite of a traditional horseshoe so as to include a connected or closed portion adjacent the back end 102 (i.e., adjacent the horse's heel), and an open portion adjacent the front end 104 (i.e., adjacent the horse's toe). Traditional horseshoes are closed near the toe and open near the heel.

Figure 2:
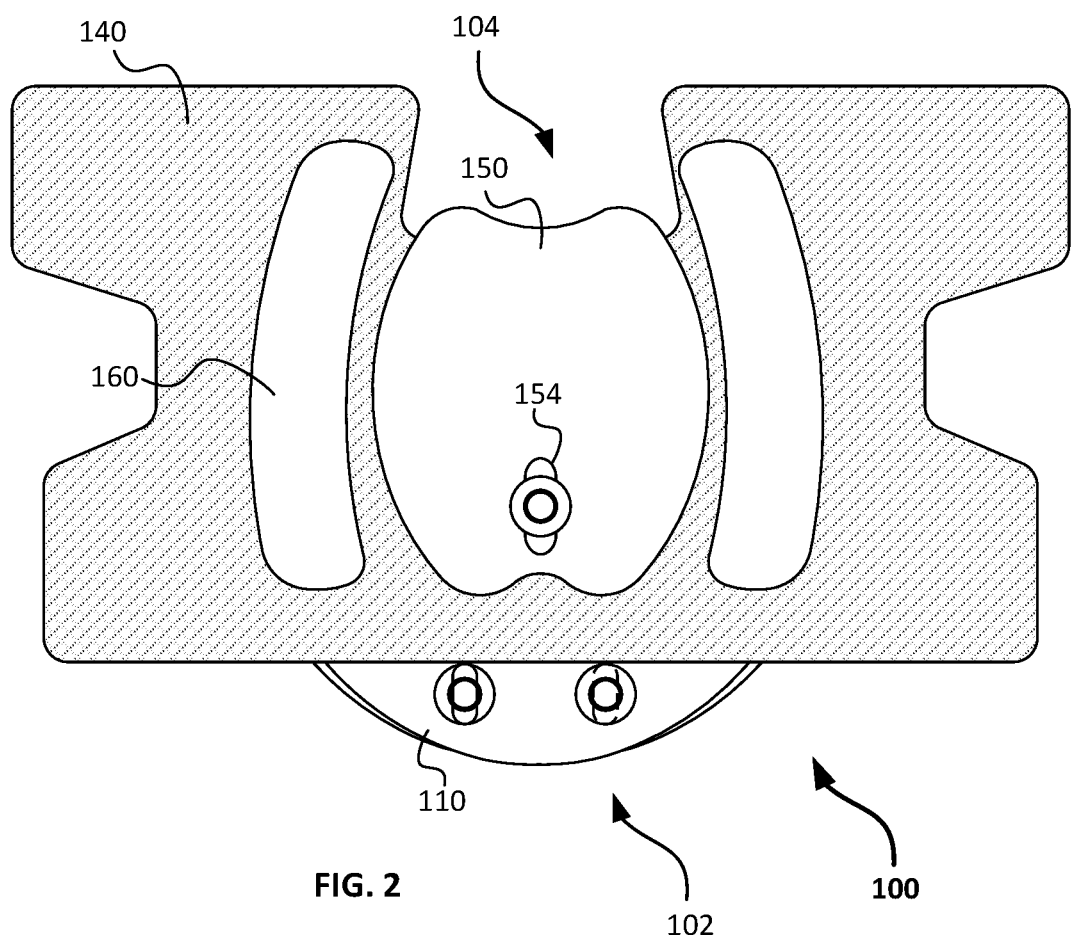
FIG. 2 is a schematic top view of the horseshoe of FIG. 1.

Horseshoe 100 includes several components coupled together, which will be appreciated from examining the bottom view of the horseshoe of FIG. 1, and the corresponding top view of FIG. 2. As shown in FIG. 1, horseshoe 100 includes a metallic curved or U-shaped heel plate 110. In FIG. 1, heel plate 110 substantially overlaps with wedge 130 and is hidden behind it. For this reason, it is shown in its entirety in the detailed view without the other components. Heel plate 110 may be formed of a metal such as steel, aluminum or iron, or any other suitable material having the desired stiffness to support the animal's weight. Heel plate 110 may include a pair of vertical slots 112 near the center of the plate, and a pair of substantially horizontal slots 114 adjacent each end of the plate. Each of slots 112 and 114 may be sized to allow a screw or other fastener to translate therein to allow for movements of other components of the horseshoes relative to the heel plate as will be discussed in more detail below.

A pair of side branches 120 are removably coupleable to heel plate 110. In some examples, side branches are made of acrylonitrile butadiene styrene (ABS) or other similar polymer, or any other suitable material. Alternatively, branches may be formed of a metal. Each side branch 120 may overlap with a portion of heel plate 110 and may include a number of circular apertures 124 capable of accepting fasteners "F". Most fasteners "F" are depicted as screws with a hexagonal socket although it will be understood that other screws, clips or coupling means are capable of being used instead of some or all of the screws. Each side branch 120 further includes a first of circular apertures 124a arranged to overlap with horizontal slot 114 of heel plate 110, and configured to accept a fastener to removably couple the side branch 120 to the heel plate 110. It will be understood that a second side branch is likewise coupleable to the other side of heel plate so that the two side branches form a mirror image of one another. As shown, each side branch includes additional apertures 124 that are not used to couple to the heel plate. Instead, the additional apertures 124 accept screws to further couple to the side branches to a fabric 140 as will be discussed in more detail below.

A heel wedge 130 is further coupled to heel plate 110. Heel wedge 130 may be formed of a hard plastic or metal. Heel wedge may have an inverted T-shape that includes a lower curved portion and a rectangular portion. Lower curved portion mimics the curvature of heel plate 110, the lower portion having a pair of first holes 132 aligned with vertical slots 112 of heel plate 110 to couple the wedge to the heel plate via fasteners or screws. Heel wedge may further include a generally rectangular portion having a secondary hole 134 to couple the heel plate to fabric 140 and other optional components of the horseshoe. Heel wedge 130 also has varying heights that provide an inclined or sloped surface to support the heel of the animal. Details of this incline will be discussed in greater detail with reference to FIG. 6.

A fabric 140 is disposed above the heel plate 110, the side branches 120 and the wedge 130 (i.e., closer to the hoof). The fabric may be formed of a woven nylon fabric (or nylon webbing) or other suitable material. In some examples, the nylon material is reusable as it allows for mechanical adherence of an epoxy or other material, but does not allow impregnation of the adhesive material in the nylon material. The material of fabric 140 may be selected to be durable and to have a surface capable of being securely coupled to the hoof of an animal using an epoxy or other suitable adhesives. Fabric 140 may have a butterfly-shape of two complementary halves, symmetric about a longitudinal axis. Each half may include a pair of flaps 141a, 141b. The flaps are connected to complementary flaps on the other side of the longitudinal axis by a curved edge 142a on one side, and a straight edge 142b disposed opposite the curved edge 142a. Each half may further include curved slits 144a, 144b, 144c configured, sized and arranged to accept a fastener and allow curved movement of the fastener within the slits. Curved slits 144a are spaced so as to be disposed over horizontal slots 114 of heel plate 110, and circular apertures 124 of side branches 120. As shown, the curved slits 144a, 144b, 144c are angled to correspond to certain movements of the side branches that will be described below with reference to FIG. 4A-B.

Turning to the top view of FIG. 2, an optional sole plate 150 is shown, the sole plate 150 having an egg-shape or oval-shape with upper and lower dents. The sole plate 150 may have a vertical slot 154 for coupling the sole plate to wedge 130 via a fastener passing through secondary hole 134 of the wedge 130. Sole plate 150 may be formed of a suitable cushioned, shock-absorbing material as it will contact the bottom of the horse's hoof.

A pair of cushions 160 are also disposed above fabric 140 on either side of the sole plate 150, each of the cushions 160 having a shape substantially similar to that of side branches 120 so that the side branches 120 and the cushions 160 substantially overlap. Cushions 160 may be formed of the same material as sole plate 150. In at least some examples, sole plate 150 and/or cushions 160 are coupled to fabric 140 via an epoxy, glue, or other suitable adhesive.

Figure 3:
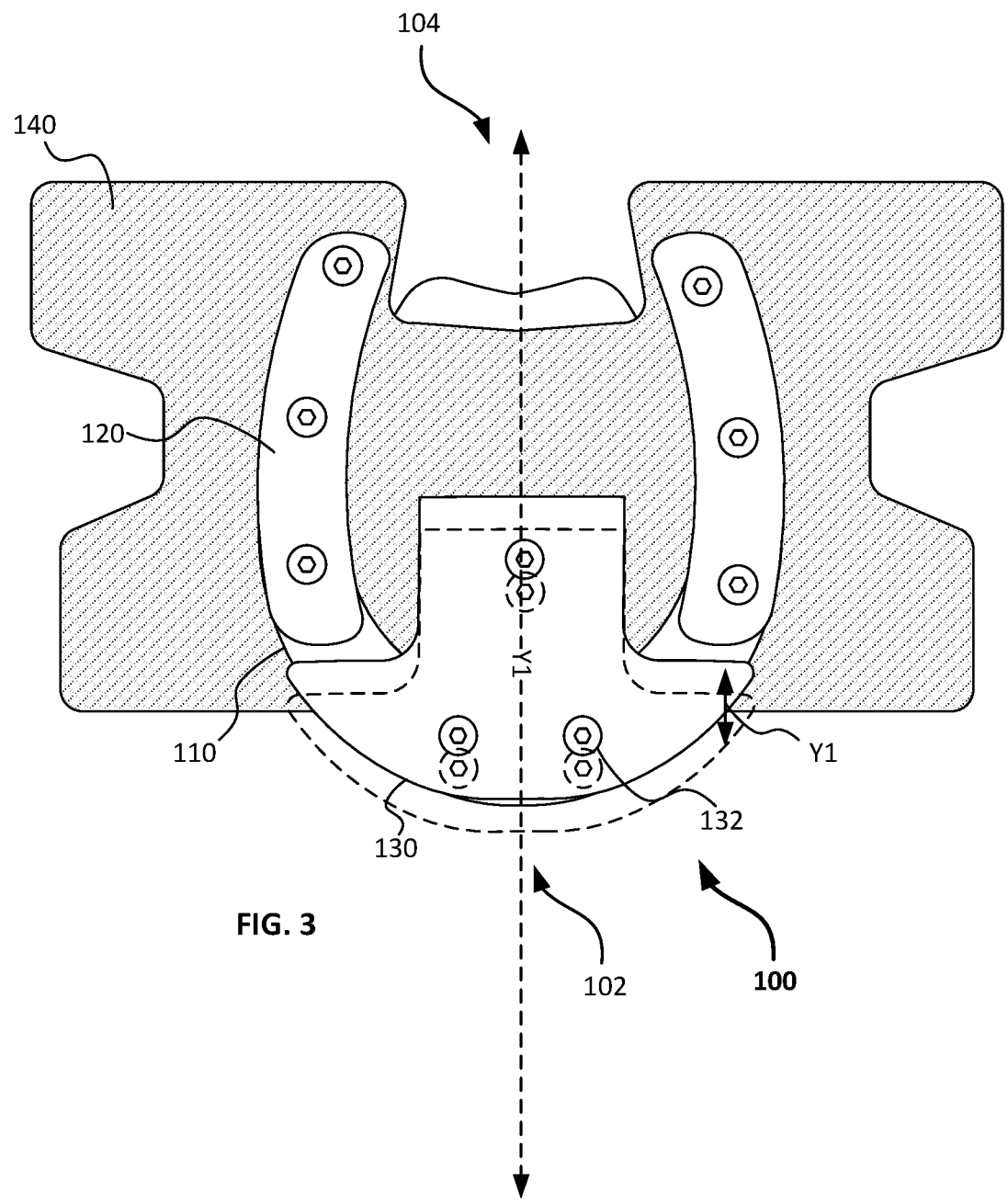
FIG. 3 is a schematic bottom view of the horseshoe of FIG. 1 showing translation of the heel wedge.

Various portions of horseshoe 100 may be adjustable to accommodate hoofs of different shapes and/or sizes, or to increase comfort for the animal. First, wedge 130 may be translated forward and backward relative to heel plate 110 (FIG. 3). Specifically, fasteners that pass through first holes 132 of wedge 130 to couple the wedge to heel plate 110 may be translated within vertical slots 112 to a predetermined position to choose the spacing of the wedge with respect to the heel plate 110. In at least some examples, slots 112 may have a length of 1.27 cm (½ an inch) to allow the wedge to translate longitudinally along axis Y1 toward and away from back end 102 to accommodate shorter and longer hoofs.

Second, side branches may slide laterally as shown in FIG. 4B. Specifically, a fastener extends through circular apertures 124 and horizontal slots 114 of heel plate 110, and the fastener is translatable within the horizontal slots. Additionally, due to size, location and positioning of curved slits 144a,144b,144c, side branches 120 are capable of movement relative to the fabric 140 along axis X1. In at least some examples, horizontal slots 114 of heel plate 110 1.27 cm are (½ inch) in length to allow for a complementary amount of movement of the side branches relative to the heel plate. In some examples, curved slits 144a,144b,144c of fabric 140 may be oversized to allow both translation and rotation of the side branches relative to the fabric.

In embodiments having the optional sole plate 150, the position of the sole plate may be adjustable (FIG. 5). As previously noted, the sole plate 150 may have a vertical slot 154 for coupling the sole plate to wedge 130 via a fastener passing through secondary hole 134. This fastener may be translatable within the vertical slot 154 so that the sole plate is capable of movement in the direction of axis Y3. In at least some examples, vertical slot 154 is approximately 1.27 cm (½ inch) in length so that the sole plate is translatable within a range of 1.27 cm (½ inch) in the direction of Y3.

As shown in FIG. 6, the height of wedge 130 may be chosen to provide the proper support to the heel of the horse. For examples, wedges of heights between 0.635 cm (¼ inch)

and 5.08 cm (2 inches) are possible. Additionally, because wedges 130 of different heights h1, h2, h3 are provided, and because the wedges are easily decouplable from the heel plate 110 and/or the sole plate 150, the wedges can be easily interchanged to select a proper wedge for maximum support and comfort to the horse. Another feature of horseshoe 100 that can be appreciated from FIG. 6 is the relationship between the heights of heel plate 110 and side branches 120. As shown, the top surfaces of side branches 120 and heel plate 110 collectively provide a curved, even upper surface on which the fabric 140 will rest. In one embodiment, the even upper surface is provided by milling a portion of the side branch so that the heel plate 110 rests on a portion of the side branch as shown. Alternatively, side branches 120 may be formed of two layers 121*a*,121*b* that are adhered with one another, the lower layer 121*b* being longer than the upper layer 121*a* so that heel plate 110 nests on top of the lower layer 121*b* and provides an even upper surface with the top player 121*a*.

FIGS. 7A and 7B illustrate side and front views of the horseshoe 100 being coupled to the hoof of an affected horse requiring support. As shown, wedge 130 raises the heel of the animal by a predetermined amount, while the side branches provide support near the toe. Fabric 140 has been adhered to the hoof of the animal via epoxy or other suitable means to secure the horseshoe 100 to the hoof. Due to the adjustability of the various components, proper fitment may be achieved by translating the wedge, rotating or translating the side branches, and/or translating the sole plate. Additionally, if it is necessary to provide additional or less support for the heel, the horseshoe can be easily removed, and the wedge can be interchanged for another wedge having a different incline. Multiple wedges may also be used in succession on the same animal as the animal's gait is observed. Certain adjustments may also be made without entirely removing the horseshoe from the hoof, and specifically without removing the fabric. For example, the wedge may be easily translated by actuating the fasteners without removal of the fabric from the animal.

Certain variations are possible. For example, FIGS. 8A-B present another example of the inverted horseshoe having some additional or modified features. A wedge is not shown in FIG. 8A for the sake of clarity. Each of the elements of FIGS. 8A-B correspond to like-numerals except that the reference character begins with an "8" instead of "1", the elements being similar or exactly the same in material, construction, and fabrication. For example, a heel plate 810 is shown which is similar to heel plate 110. As shown, inverted horseshoe 800 includes some differences from horseshoe 100. For example, each branch includes two components and is split between primary member 820*a*, and secondary member 820*b*, the primary member being attachable to the heal plate 810 and the secondary member being attachable to the primary member as shown. In some examples, primary member 820*a* may be formed of a metal such as aluminum and may be attached on top of the heal plate 810, and secondary member 820*b* may be made of ABS and may be attached to the bottom of the primary member 820*a* such that the secondary member 820*b* and the heal plate 810 are aligned with one another as shown in FIG. 8A.

Additionally, as shown in FIG. 8A-1 heel plate 110 may include two-way +-shaped slots 814 that allow a screw to translated therein in two perpendicular directions, allowing the attached branches to translate both horizontally away from each other, and vertically (i.e., farther from or closer to back end 802). Alternatively, as shown in 8A-2, heel plate may include only the horizontal slot, and primary member 810*a* of the branch may include vertical slot 824, the vertical slot 824 of the primary member and the horizontal slot of the heel plate being capable of providing several configurations and/or adjustments to the position and arrangement of the branches with respect to the heel plate. It will be understood that the opposite arrangement is also possible in which the heel plate includes the vertical slot and the primary member includes the horizontal slot.

The shape of fabric 840 is also slightly different and has a greater width along the front end 804 than the back end 802.

As shown in FIG. 8B, another feature that has not been discussed is the inclusion of a pair of molded clips 850 are disposed outside the fabric on either side of the branches. These clips serve to stabilize the hoof of the animal within the horseshoe and to guide the hoof in position. Molded clips 850 may be unitary with the branches or attached thereto. Clip 850 may also be formed of the same or different material than the branches. In some examples, molded clips 850 may be coupled to the side branches adjacent the front end 804 and halfway between the front end 804 and the back end 802. It will be understood that the position of the molded clips 850 may be changed as desired.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

It will be appreciated that the various dependent claims and the features set forth therein can be combined in different ways than presented in the initial claims. It will also be appreciated that the features described in connection with individual embodiments may be shared with others of the described embodiments.

What is claimed is:

1. A horseshoe having a front end and a back end comprising:
    a curved heel plate disposed adjacent the back end;
    a pair of side branches coupled to opposing ends of the curved heel plate;
    a heel wedge coupled to the heel plate, the wedge being translatable relative to the heel plate;
    a fabric coupled to the pair of side branches; and
    a pair of cushions coupled to the fabric and disposed over the pair of side branches.

2. The horseshoe of claim 1, wherein each of the pair of side branches are coupled to the heel plate via a fastener, and are capable of articulating about the fastener.

3. The horseshoe of claim 1, wherein each of the pair of side branches are coupled to the heel plate via a fastener, and are capable of translating laterally relative to the heel plate closer and farther from each other.

4. The horseshoe of claim 1, wherein the heel plate includes two vertical slots adjacent its center and two horizontal slots on opposing ends of the heel plate.

5. The horseshoe of claim 1, wherein the heel wedge is coupled to the heel plate via fasteners passing through the vertical slots.

6. The horseshoe of claim 5, wherein the vertical slots are ½ inch in length.

7. The horseshoe of claim 1, further comprising a sole plate coupled to the wedge.

8. The horseshoe of claim 7, wherein the sole plate includes an elongated slot so that the sole plate is couplable to the wedge at various positions.

9. The horseshoe of claim 1, wherein the pair of cushions are coupled to the fabric via an adhesive.

10. The horseshoe of claim 1, wherein the wedge has a height of ½ inch.

11. The horseshoe of claim 1, wherein the wedge has a height of 1 inch.

12. The horseshoe of claim 1, wherein the fabric includes two halves, each half having two flaps and a number of curved slits.

13. The horseshoe of claim 12, further comprising an epoxy disposed on the fabric configured to couple the flaps of the fabric to an animal's hoof.

14. A horseshoe having a front end and a back end comprising:
a heel plate disposed adjacent the back end and having two horizontal slots and at least one vertical slot;
a pair of side branches coupled to opposing ends of the heel plate via the horizontal slots;
a heel wedge coupled to the heel plate, the wedge being coupled to the heel plate via the at least one vertical slot, the heel wedge further including a secondary hole;
a fabric coupled to the pair of side branches, the fabric including two halves, each half having two flaps and number of curved slits;
a pair of cushions coupled to the fabric and disposed over the pair of side branches; and
a sole plate coupled to the secondary hole of the heel wedge.

15. The horseshoe of claim 14, wherein each of the pair of side branches are coupled to the heel plate via a fastener, and are capable of articulating about the fastener.

16. The horseshoe of claim 14, wherein each of the pair of side branches are coupled to the heel plate via a fastener, and are capable of translating laterally relative to the heel plate closer and farther from each other.

17. The horseshoe of claim 14, wherein the sole plate includes an elongated slot and a fastener passes through the elongated slot and the secondary hole of the heel wedge.

18. A method of supporting a horse's hoof comprising:
providing with a horseshoe having a front end and a back end including a curved heel plate disposed adjacent the back end, a pair of side branches coupled to opposing ends of the curved heel plate, a heel wedge coupled to the heel plate, the wedge being translatable relative to the heel plate, a fabric disposed coupled to the pair of side branches, and a pair of cushions coupled to the fabric and disposed over the pair of side branches;
adjusting an angle of each of the side branches; and
adjusting a position of the heel wedge relative to the heel plate.

* * * * *